United States Patent [19]

Zuccaro

[11] Patent Number: 5,421,124
[45] Date of Patent: Jun. 6, 1995

[54] ADJUSTABLE VEHICLE DOOR WEDGE

[75] Inventor: Dante C. Zuccaro, Allenton, Mich.

[73] Assignee: General Motors Corporation, Detroit, Mich.

[21] Appl. No.: 293,980

[22] Filed: Aug. 22, 1994

[51] Int. Cl.$^6$ .......................... E06B 3/34; E05F 5/06
[52] U.S. Cl. .............................. 49/381; 16/DIG. 6; 49/70; 49/400
[58] Field of Search .................. 49/381, 400, 472, 70; 296/207; 16/DIG. 6, 82

[56] References Cited

U.S. PATENT DOCUMENTS

| | | |
|---|---|---|
| 3,113,797 | 12/1963 | Westerdale ............... 16/DIG. 6 X |
| 4,932,100 | 6/1990 | Flowers et al. ............ 296/207 X |
| 4,936,621 | 6/1990 | Shimoda et al. .......... 296/207 X |

*Primary Examiner*—Philip C. Kannan
*Attorney, Agent, or Firm*—Ernest E. Helms

[57] ABSTRACT

A vehicle door wedge is provided including in a preferred embodiment a bracket having opposing ears, the bracket being connected to a door; a threaded shaft rotatably mounted by the ears of the bracket, the shaft having a head and being threadably engaged with the bracket ear generally least adjacent to the head of the shaft, the head of the shaft having a gap with the ear of the bracket to which it is most adjacent; and an elastomeric eccentrically mounted bumper mounted on the shaft. The bumper has a hardened member embedded therein and is rotated by the shaft to contact a door opening, preventing rattling of the door in the opening. The bumper is held in position by continuous rotation of the shaft causing the gap between the shaft head and the most adjacent bracket ear to be closed and for the bracket ears to elastically deform to capture the bumper until such time as the bracket ears are restrained from further deformation by resistance provided by the hardened member within the bumper.

6 Claims, 3 Drawing Sheets

ADJUSTABLE VEHICLE DOOR WEDGE

FIELD OF THE INVENTION

The field of the present invention is that of door wedges for large van or utility-type vehicles to ensure that the door is snug when closed in a door opening.

BACKGROUND OF THE INVENTION

Many van vehicles have rear doors which swing from a hinge. Especially when considering rear door of the van-type vehicle where there are split or double doors, the doors do not have a rigid pillar onto which they can close. In such situations, it has been the practice to provide a door wedge to ensure that the door is snug in the door opening and to inhibit any vibration of the door.

Referring to FIG. 6, prior to the present invention, a solid elastomer piece 11 was often provided on a metal backing 13 connected to a door 15 by a threaded fastener 17. Due to the build tolerances of the door 15 and a flange 19 of a door opening 21, it was very hard to gauge the height of the door wedge 11. If the door wedge 11 was too high, the door would be difficult if not impossible to shut. If the door wedge was too low, it would be ineffective. To meet the above-noted challenge, shims (not shown) were placed between the metal backing 13 and a top flange 23 of the door. The placement of the shims could only be done by trial and error and was time consuming and not a pleasant task to the assembly operator.

In an attempt to alleviate the problems associated with the door wedge 11 shown in FIG. 6, a new door wedge 25 (FIG. 5) which was self adjusting was provided and was mounted on a shaft 27 and spring biased to an engaged position by coil spring 29. Although an improvement over the door wedge 11, the door wedge 25 presented a special problem in that it made the angle of the contacting portion 31 of the door opening flange very critical. Instead of being in the correct angular orientation as shown in FIG. 5, if it were more toward the line 33 for the same vertical door load, a larger horizontal load will be transferred through the wedge 25, resulting in a lower vertical door load to cause displacement of the wedge 25, allowing the door 15 to also be displaced. If the angle of flange 31 was more along the line 35, the door wedge 25 would be wedged in position and would not adjust to its more correct position, causing the door 15 to be too difficult to close, and would decrease the amount of vertical gap for which the wedge will compensate.

SUMMARY OF THE INVENTION

To overcome the above-noted problems associated with prior door wedges, the present invention is brought forth. The present invention provides a door wedge which in a preferred embodiment provides an elastomeric eccentrically mounted cam placed on a threaded shaft. The shaft is turned to engage the cam with an upper or a lower portion of a door opening (or with the door, if placed on the door opening flange). The shaft continually turns until it causes the ears of the bracket to deform the capture the bumper and retain it in its engaged position.

DESCRIPTION OF THE PREFERRED EMBODIMENT

Figure 1:
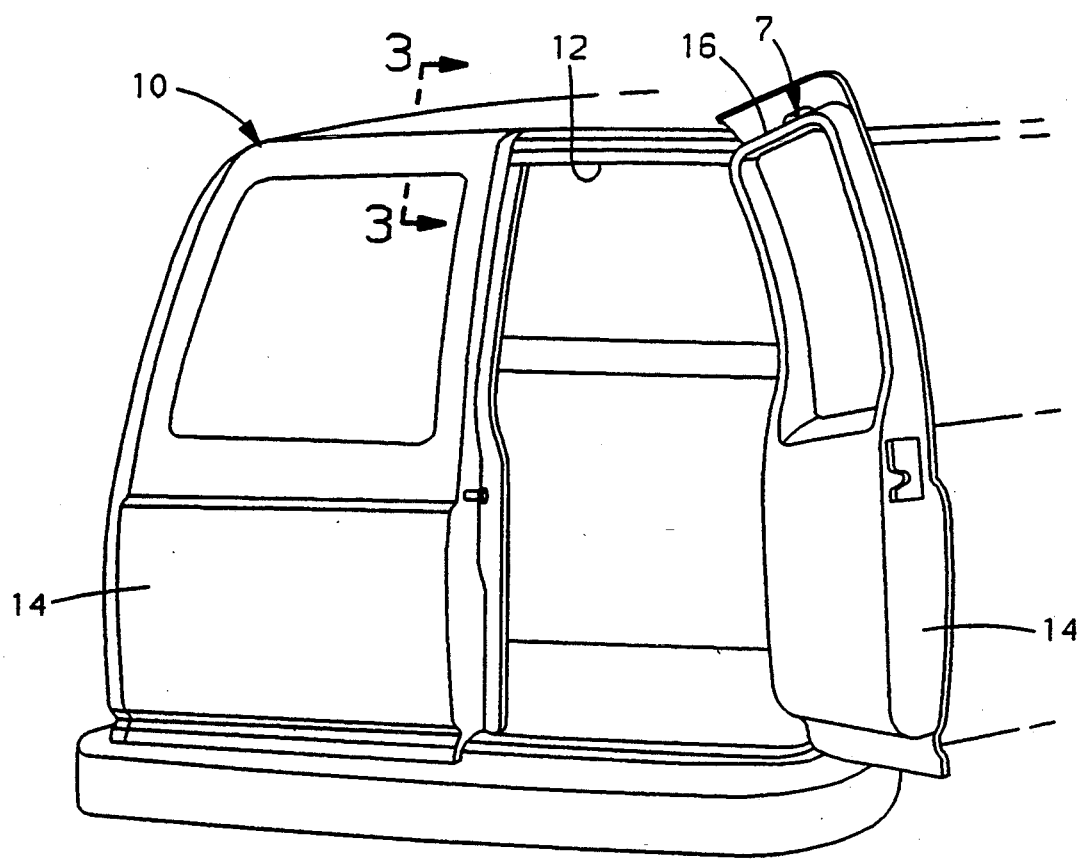
FIG. 1 is a perspective view of a rear door opening of a van-type vehicle which utilizes double doors without a center pillar.

Referring to FIGS. 1 through 4, a van-type vehicle 10 has two rear doors 14 which enclose a rear door opening 12. When closed, the doors mate with each other, and there is no center pillar between them. A door wedge 7 according to the present invention is fixably connected to a top flange 16 of each of the doors 14 by two bolts 18. The door wedge 7 has a bracket 20 with opposing ears 22 and 24. The ears mount a threaded shaft 26 having a head 28. Between the head 28 and its adjacent ear 22, there will be provided a slight gap. An end 30 of the shaft 26 opposite the head 28 is threadably engaged with the least most adjacent ear 24 to the head 28. The head 28 of the shaft 26 is typically stamped to receive an allen head wrench.

Figure 2:
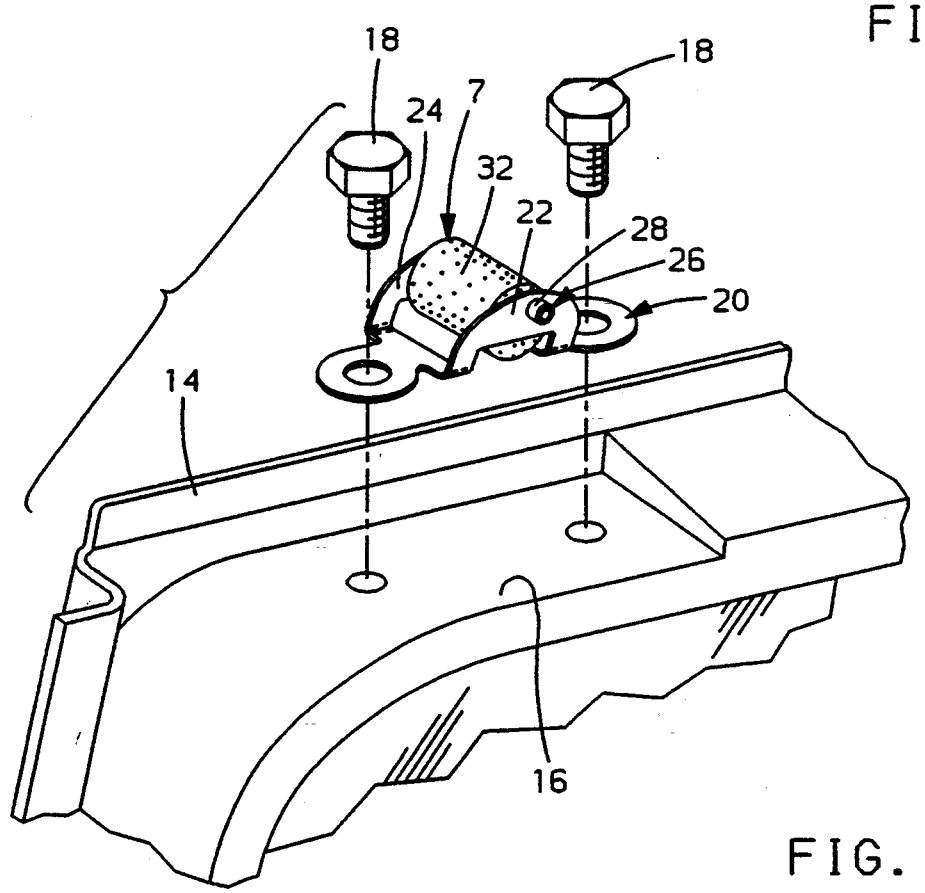
FIG. 2 is a perspective view of a preferred embodiment of the present invention before attachment to a top flange of the vehicle door.
Figure 3:
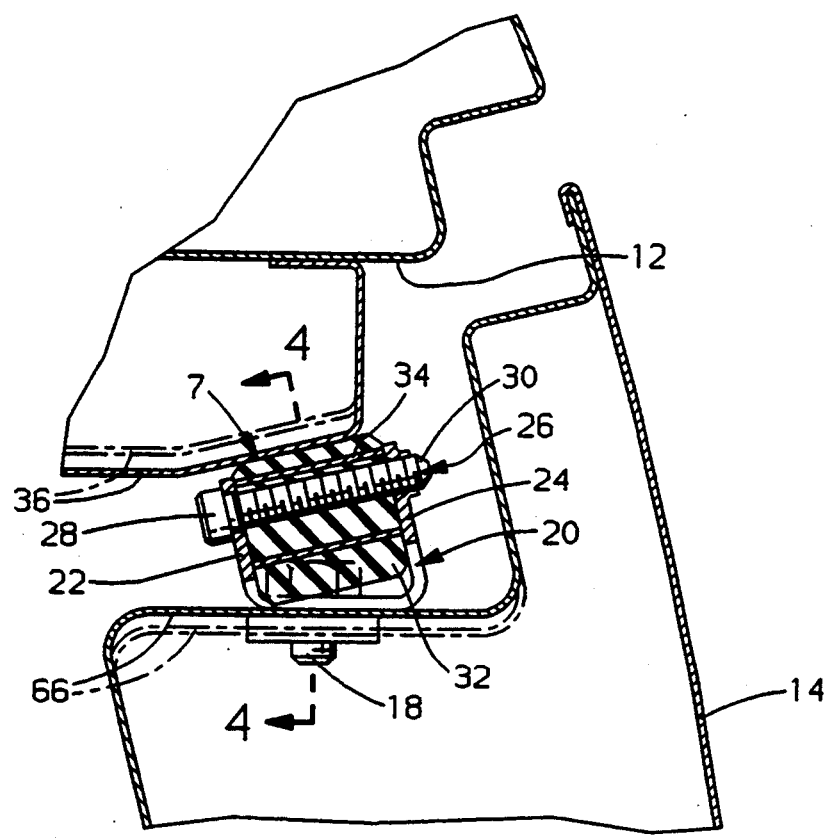
FIG. 3 is a view taken along line 3—3 of FIG. 1.
Figure 4:
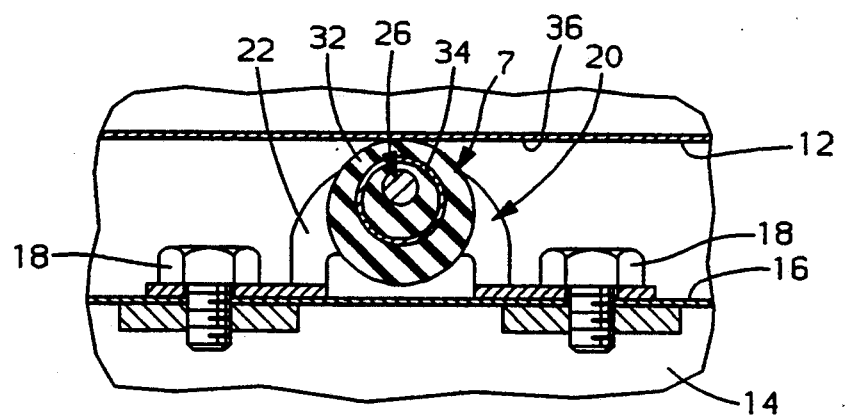
FIG. 4 is a view taken along line 4—4 of FIG. 3.
Figure 5:
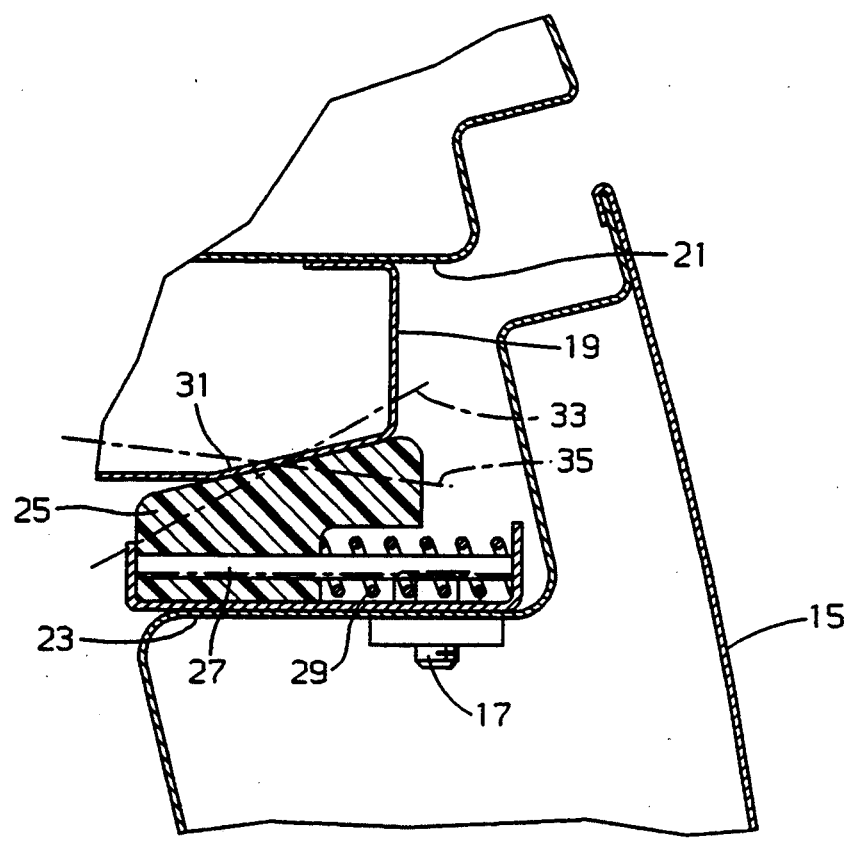
FIG. 5 is a view similar to FIG. 3 showing a prior art door wedge.
Figure 6:
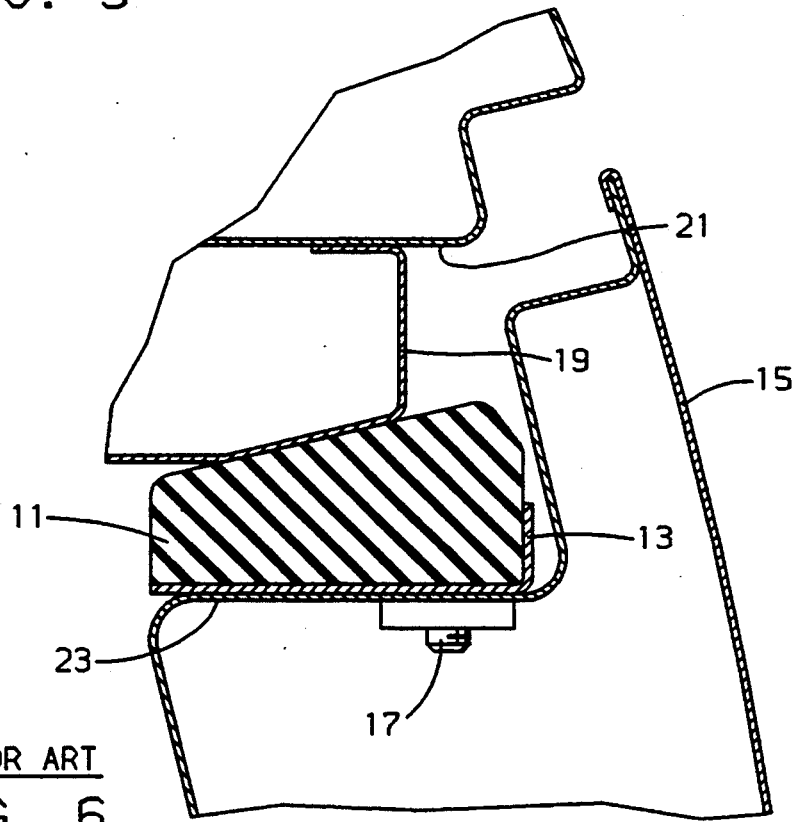
FIG. 6 is a view similar to FIG. 3 showing another prior art door wedge.

Eccentrically encircling the shaft 26 is a polymeric, typically elastomeric, bumper 32. Bumper 32 has embedded within, also in eccentric relationship to the shaft 28 and the bumper 32, a hard material, typically steel, insert 34. In operation, when first attached to the door 14, the elastomeric bumper 32 will have its largest dimension facing downward as shown in FIGS. 2 through 4. The door will be typically shut. An allen head air-driven torque wrench will be inserted into the head 28 and turned until the bumper 32 mates with the surface 36 of the door flange. When the bumper 32 mates with surface 36, the threads of shaft 26 will tear or slip away from the bumper 32. The gap between the head 28 and the ear 22 will be closed. Thus, with continuous rotation, the ears 22 and 24 will be deformed toward one another, capturing the bumper 32 in position until such time as movement of the ears 22, 24 is resisted by contact or pressure against the hardened enclosure 34. When the ears 22 and 24 come in close contact with the hardened member 34, the torque required by the wrench will spike upward, alerting the controller on the wrench to stop. The door wedge 7 is now correctly adjusted in position. If in a situation as shown in phantom surface 36 is in its dotted line position and/or the door flange 16 is in its lower phantom position, the bumper 32 will continue to rotate to the position shown in phantom to compensate for the increased clearance until such time as it will again make contact with the door opening flange surface 36 and thereafter cause the ears 22 and 24 to close on the bumper 32. By virtue of this feature, the assembler need not look at the door wedge 7 to properly adjust it; adjustment is totally automatic.

It will be apparent to those skilled in the art that the present invention may be used on single door vehicles on the top, bottom or side positions.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In a vehicle having a first door member and a door opening with a flange member bordering at least a portion of the opening, a door wedge comprising:

a bracket having opposing ears, the bracket being connected to one of the members;

a threaded shaft rotatably mounted by the ears of the bracket, the shaft having a head along one end and being threadably associated with the ear of the bracket generally least adjacent to the head of the shaft; and an eccentrically mounted bumper mounted on the shaft, the bumper being rotated by the shaft to contact the member other than the member the bracket is attached to, preventing rattling of the door member in the opening, and the bumper is held in position by continuous rotation of the shaft causing movement of the bracket ears to capture the bumper.

2. A wedge as described in claim 1 wherein the bracket is mounted to the door.

3. A wedge as described in claim 1 wherein the bumper is made from a polymeric material.

4. A door wedge as described in claim 3 wherein the bumper polymeric material is an elastomeric material.

5. A door wedge as described in claim 1 having a hardened member operatively associated with the bumper, contacting and limiting the capturing movement of the bracket ears.

6. In a vehicle having a first door member and a door opening, the door opening having a flange member bordering a portion of the opening, a door wedge comprising:

a bracket having opposing ears, the bracket being connected to one of the members;

a threaded shaft rotatably mounted by the ears of the bracket, the shaft having a head and being threadably engaged with the bracket ear generally least adjacent to the head of the shaft, the head of the shaft having a gap with the ear of the bracket to which it is most adjacent; and an elastomeric eccentrically mounted bumper mounted on the shaft, the bumper having a hardened member embedded therein, the bumper being rotated by the shaft to contact the member other than the member the bracket is attached to, preventing rattling of the door member in the opening, and the bumper is held in position by continuous rotation of the shaft causing the gap between the shaft head and the most adjacent bracket ear to be closed and for the bracket ears to elastically deform to capture the bumper until such time as the bracket ears are restrained from further deformation by resistance provided by the hardened member within the bumper.

* * * * *